US008898642B2

(12) United States Patent
Beale et al.

(10) Patent No.: US 8,898,642 B2
(45) Date of Patent: Nov. 25, 2014

(54) PROFILING AND SEQUENCING OPERATORS EXECUTABLE IN AN EMULATED COMPUTING SYSTEM

(75) Inventors: Andrew Ward Beale, Mission Viejo, CA (US); Loren C. Wilton, Rancho Cucamonga, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/398,122

(22) Filed: Feb. 16, 2012

(65) Prior Publication Data

US 2013/0219370 A1    Aug. 22, 2013

(51) Int. Cl.
*G06F 9/45*      (2006.01)
*G06F 11/34*      (2006.01)

(52) U.S. Cl.
CPC ...... *G06F 11/3466* (2013.01); *G06F 2201/865* (2013.01)
USPC ........................................................ 717/128

(58) Field of Classification Search
CPC .................................................. G06F 11/3466
USPC ........................................................ 717/128
See application file for complete search history.

(56) References Cited

U.S. PATENT DOCUMENTS

| | | | | |
|---|---|---|---|---|
| 7,516,061 | B1 * | 4/2009 | Irving et al. ..................... | 703/27 |
| 2005/0149915 | A1 * | 7/2005 | Wu et al. ........................ | 717/137 |
| 2011/0145800 | A1 * | 6/2011 | Rao et al. ....................... | 717/133 |
| 2013/0080744 | A1 * | 3/2013 | Beale ............................. | 712/220 |
| 2013/0219370 | A1 * | 8/2013 | Beale et al. .................... | 717/128 |

OTHER PUBLICATIONS

VTune JIT 2010, VTune Analyzer JIT Profiling Plug-in for Tamarin (Published Jul. 7, 2010) retrieved from https://wiki.mozilla.org/images/1/14/VTuneJITProfilingInstallationGuide.pdf on Sep. 28, 2013.*
VTune, in view of VTune 64, VTune Analyzer (Published Nov. 14, 2007), retrieved from http://it.toolbox.com/wiki/index.php/VTune_Analyzer on Sep. 28, 2013.*

* cited by examiner

*Primary Examiner* — Don Wong
*Assistant Examiner* — Theodore Hebert
(74) *Attorney, Agent, or Firm* — James E. Goepel

(57) ABSTRACT

Methods and systems are disclosed for analyzing performance of a translated code stream executing within a central processing module. One method includes, during execution of one or more native instructions corresponding to each non-native operator in the code stream by the code execution unit, counting the occurrence of the non-native operator, determining a duration of execution of the one or more native instructions, and adding the non-native operator to a trace sequence. The method also includes, after execution of the code stream within the central processing module, generating a data file of non-native operators executed within the code stream, the data file of operators including a name of each non-native operator, an elapsed amount of time within the code execution unit that the one or more native operators corresponding to the non-native operator are executed, and a number of occurrences of the non-native operator within the code stream.

20 Claims, 9 Drawing Sheets

| | 702 | | 704 | 706 | 708 | 710 | 712 |
|---|---|---|---|---|---|---|---|
| Op | OpMode | Mnemonic | Microsec | Count | uS/Op | Percent | Cumul |
| '6B' | 6 | CPR_LIT_NAMC_INDX | 1,162,507 | 79,639,710 | 0.015 | 7.42% | 7.42% |
| '179' | 6 | cpr_set_curop | 1,072,132 | 15,435,322 | 0.069 | 6.84% | 14.26% |
| '1B6' | 6 | TUND_desc | 549,343 | 2,050,409 | 0.268 | 3.51% | 17.77% |
| 'F7' | 6 | CPR_NAMC_NXLV | 488,869 | 17,482,255 | 0.028 | 3.12% | 20.89% |
| '1A3' | 6 | CPR_LIT_TUND_desc | 484,279 | 4,042,093 | 0.120 | 3.09% | 23.98% |
| '53' | 6 | CPR_LIT_EQUL_fast_BRxx | 419,046 | 40,908,980 | 0.010 | 2.67% | 26.65% |
| '1C4' | 6 | ENTR_sirw | 351,689 | 2,429,691 | 0.145 | 2.24% | 28.90% |
| '6D' | 6 | CPR_LIT_NAMC_NXLV | 349,742 | 19,712,355 | 0.018 | 2.23% | 31.13% |
| '152' | 6 | CPR_VALC1 | 321,979 | 51,872,699 | 0.006 | 2.06% | 33.19% |
| '1C3' | 6 | ENTR_II_plus_1 | 315,447 | 4,332,308 | 0.073 | 2.01% | 35.20% |
| '5A' | 6 | CPR_LIT_ICRD | 314,768 | 8,239,846 | 0.038 | 2.01% | 37.21% |
| '1C8' | 6 | STOD_via_i1dd | 309,085 | 20,753,320 | 0.015 | 1.97% | 39.18% |
| 'BD' | 1 | LOAD | 300,523 | 20,006,246 | 0.015 | 1.92% | 41.10% |
| 'FC' | 6 | CPR_NAMC_STOD | 295,157 | 30,842,215 | 0.010 | 1.88% | 42.98% |
| 'FD' | 1 | LODC | 281,221 | 20,451,139 | 0.014 | 1.79% | 44.78% |
| 'EF' | 6 | CPR_NAMC_INDX | 261,632 | 12,864,758 | 0.021 | 1.67% | 46.45% |
| '195' | 6 | CPR_LIT_CREL_desc | 255,636 | 3,047,538 | 0.084 | 1.63% | 48.08% |
| '02' | 6 | CPR_BRFL | 235,209 | 19,643,955 | 0.012 | 1.50% | 49.58% |
| '1C6' | 6 | EXIT_opt | 215,257 | 4,738,370 | 0.045 | 1.37% | 50.95% |

*FIGURE 7*

| Op 1 | Op 2 | Op 3 | Count 1 | Count 2 | Count 3 | Time 1 | Time 2 | Time 3 |
|---|---|---|---|---|---|---|---|---|
| CPR_VALC1 | CPR_LIT_ADD_fast | CPR_NAMC_STON | 31,404,041 | 4,158,797 | 1,916,843 | 173,262 | 20,979 | 15,942 |
| CPR_VALC1 | CPR_LIT_ADD_fast | CPR_NAMC_STOD | 31,404,041 | 4,158,797 | 1,184,837 | 173,262 | 20,979 | 10,878 |
| CPR_VALC1 | CPR_LIT_ADD_fast | LODT | 31,404,041 | 4,158,797 | 281,836 | 173,262 | 20,979 | 7,783 |
| CPR_VALC1 | CPR_LIT_ADD_fast | CPR_LT16 | 31,404,041 | 4,158,797 | 233,261 | 173,262 | 20,979 | 1,564 |
| CPR_VALC1 | CPR_LIT_ADD_fast | CPR_NAMC_INDX | 31,404,041 | 4,158,797 | 228,936 | 173,262 | 20,979 | 3,869 |
| CPR_VALC1 | CPR_LIT_ADD_fast | CPR_NAMC_NXLN | 31,404,041 | 4,158,797 | 155,418 | 173,262 | 20,979 | 3,503 |
| CPR_VALC1 | CPR_LIT_ADD_fast | CPR_NAMC_NXLV | 31,404,041 | 4,158,797 | 88,972 | 173,262 | 20,979 | 2,002 |
| CPR_VALC1 | CPR_LIT_ADD_fast | CPR_NAMC_INDX_DUPL | 31,404,041 | 4,158,797 | 19,645 | 173,262 | 20,979 | 458 |
| CPR_VALC1 | CPR_LIT_ADD_fast | CPR_VALC1 | 31,404,041 | 4,158,797 | 14,595 | 173,262 | 20,979 | 81 |
| CPR_VALC1 | CPR_LIT_ADD_fast | CPR_NAMC_LODT | 31,404,041 | 4,158,797 | 7,984 | 173,262 | 20,979 | 61 |
| CPR_VALC1 | CPR_LIT_ADD_fast | CPR_VALC_ADD | 31,404,041 | 4,158,797 | 3,838 | 173,262 | 20,979 | 29 |
| CPR_VALC1 | CPR_LIT_ADD_fast | CPR_LT8 | 31,404,041 | 4,158,797 | 2,413 | 173,262 | 20,979 | 12 |
| CPR_VALC1 | CPR_LIT_ADD_fast | STOD_via_j1dd | 31,404,041 | 4,158,797 | 1,153 | 173,262 | 20,979 | 26 |
| CPR_VALC1 | CPR_LIT_ADD_fast | DUPL | 31,404,041 | 4,158,797 | 1,096 | 173,262 | 20,979 | 6 |
| CPR_VALC1 | CPR_LIT_ADD_fast | CPR_BRUN | 31,404,041 | 4,158,797 | 1,092 | 173,262 | 20,979 | 10 |
| CPR_VALC1 | CPR_LIT_ADD_fast | NTGR | 31,404,041 | 4,158,797 | 970 | 173,262 | 20,979 | 8 |
| CPR_VALC1 | CPR_LIT_ADD_fast | CPR_VALC2 | 31,404,041 | 4,158,797 | 727 | 173,262 | 20,979 | 3 |
| CPR_VALC1 | CPR_LIT_ADD_fast | CPR_INSR_NORM_SHIFT_MASK | 31,404,041 | 4,158,797 | 608 | 173,262 | 20,979 | 5 |
| CPR_VALC1 | CPR_LIT_ADD_fast | CPR_NAMC_LOAD | 31,404,041 | 4,158,797 | 393 | 173,262 | 20,979 | 4 |
| CPR_VALC1 | CPR_LIT_ADD_fast | CPR_ISOL_WRAP | 31,404,041 | 4,158,797 | 354 | 173,262 | 20,979 | 2 |
| CPR_VALC1 | CPR_NAMC_NXLV | CPR_VALC1 | 31,404,041 | 2,125,743 | 866,120 | 173,262 | 47,833 | 4,779 |
| CPR_VALC1 | CPR_NAMC_NXLV | CPR_ISOL_NORM | 31,404,041 | 2,125,743 | 415,218 | 173,262 | 47,833 | 3,390 |
| CPR_VALC1 | CPR_NAMC_NXLV | CPR_NAMC_STON | 31,404,041 | 2,125,743 | 318,500 | 173,262 | 47,833 | 2,649 |
| CPR_VALC1 | CPR_NAMC_NXLV | CPR_BRFL | 31,404,041 | 2,125,743 | 151,374 | 173,262 | 47,833 | 1,759 |
| CPR_VALC1 | CPR_NAMC_NXLV | CPR_ISOL_NORM_BRFL | 31,404,041 | 2,125,743 | 101,411 | 173,262 | 47,833 | 1,958 |
| CPR_VALC1 | CPR_NAMC_NXLV | STOD_via_j1dd | 31,404,041 | 2,125,743 | 77,216 | 173,262 | 47,833 | 1,752 |
| CPR_VALC1 | CPR_NAMC_NXLV | CPR_LIT_LESS_fast | 31,404,041 | 2,125,743 | 73,692 | 173,262 | 47,833 | 597 |
| CPR_VALC1 | CPR_NAMC_NXLV | CPR_VALC_ADD | 31,404,041 | 2,125,743 | 50,276 | 173,262 | 47,833 | 380 |
| CPR_VALC1 | CPR_NAMC_NXLV | CPR_ISOL_NORM_MASK | 31,404,041 | 2,125,743 | 43,953 | 173,262 | 47,833 | 380 |

FIGURE 8

PROFILING AND SEQUENCING OPERATORS EXECUTABLE IN AN EMULATED COMPUTING SYSTEM

TECHNICAL FIELD

The present disclosure relates generally to computational performance, and in particular at an instruction set level. In particular, the present disclosure relates to profiling and sequencing of operators that are executable in an emulated computing system.

BACKGROUND

A computing system generally includes a central processing unit that is configured to execute program instructions which are ordered and arranged to execute various tasks. Each central processing unit has a predefined set of instructions capable of execution on that system, referred to as an instruction set. The instruction set executable by a central processing unit defines the instruction set architecture of that central processing unit.

Often, it is desirable to run software written for a particular instruction set architecture on a computing system that has a different, and incompatible, instruction set architecture. To do so, the software must be translated from the instruction set in which it is written to an instruction set compatible with the target central processing unit. This can be done at least two different ways. First, if source code is available, it can be recompiled onto the new instruction set architecture using a compiler specific to that architecture. Second, if source code is not available or if for some other reason the binary program is the desired source from which operation is to be derived, the software can be translated onto the new instruction set architecture by translating the binary program onto the new instruction set architecture on an instruction-by-instruction basis.

In comparing these two approaches, it is noted that use of source code can render a much more efficient translation to the new instruction set architecture, because efficiencies in a particular instruction set can be exploited based on the structure of the overall software. However, a recompiled source code translation cannot be used in realtime, and cannot be used if source code is unavailable. In contrast, the binary translation arrangement is generally resource intensive and does not result in execution of the most efficient translation possible. This is because each binary instruction in one language is generally translated into a sequence of binary instructions in the target language, and designed for the target architecture. That binary instruction sequence may be a different number of bits, bytes, or words long, or the particular byte and/or word length may differ across the architectures. Furthermore, the binary instruction may be byte-ordered differently in the source and target architectures, for example being big-endian or little-endian.

To accomplish execution of binary code on a non-native instruction set architecture, the binary code is often translated using an emulator designed for a target instruction set architecture. An emulator is a set of software modules that is configured to execute binary code from its native format in a way that is recognizable on a target computing system executing the target instruction set architecture. This code, referred to as emulation mode code, is parsed by the emulator to detect operators and other information that are then translated to be executed in a manner recognizable on the target computing system. For example, if a target system operates using an eight byte code word and an original native system uses a six byte code word, the emulator would look at a current and next eight byte code word in realtime, to detect one or more operators of six-byte length (e.g., in case they overlap across the eight-byte code word); the emulator would then determine corresponding instructions in the target instruction set architecture that would accomplish the same functionality as the native instruction, and execute that instruction. This code execution allows for realtime translation and execution on an operator-by-operator basis, but is inefficient, in that it may not take into account the available operators in the target system that could more efficiently execute the code when it is translated.

When executed, a translated code stream is executed by a dedicated process, which in turn executes on native hardware. Often, especially in such translated, or emulated, systems, execution performance is an issue. This can be for a variety of reasons. For example, software written such that it is optimized for one instruction set architecture may not execute well using the instructions made available via the translated instruction set architecture. However, it can be difficult to determine the exact portion of a translated code stream that is causing performance issues. Furthermore, even if it were possible to detect which portion of the translated code stream is causing issues executing on native hardware, it can be even more difficult to determine what portion of a non-native, emulated code stream corresponds to that native code at issue.

In non-emulated, native environments, a software profiling tool can be run, such as vTune Amplifier, from Intel Corporation of Santa Clara, Calif. ("vTune"). However, vTune analyzes operation of the system at the native instruction level, in the case of execution on a native Intel-based architecture (e.g., x86-32, x86-64, etc.). Such software profiling tools lack the capability of tracing sequences and execution time of a non-native instruction set being translated and executed on a target instruction set architecture. Therefore, other approaches have been attempted to trace execution of a code stream, to improve execution performance of translated code streams. To do so, it is needed to determine the time particular operators are executed and the sequence of operators that is performed. In one approach, a central processor module that executes a code stream also generates a trace of operators executed, as well as the time required for execution of those operators. However, because this was performed by the same unit that executes the code stream, and because a relatively substantial amount of analysis is required to generate this information, the additional analysis performed by the central processor module would degrade performance substantially, to the point where the code stream trace largely became impractical and unusable, due to much higher execution times.

For these and other reasons, improvements are desirable.

SUMMARY

In accordance with the following disclosure, the above and other issues are addressed by the following:

In a first aspect, a method of analyzing performance of a translated code stream executing within a central processing module is disclosed. The translated code stream corresponds to a translation of a plurality of non-native operators, and the central processing module executes on a computing system. The method includes, during execution of one or more native instructions corresponding to each non-native operator in the code stream by the code execution unit, counting the occurrence of the non-native operator, determining a duration of execution of the one or more native instructions, and adding the non-native operator to a trace sequence. The method further includes, after execution of the code stream within the central processing module, generating a data file of non-native operators executed within the code stream, the data file of operators including a name of each non-native operator, an elapsed amount of time within the code execution unit that the one or more native operators corresponding to the non-native operator are executed, and a number of occurrences of the non-native operator within the code stream.

In a second aspect, a computing system is disclosed that includes a processor and a memory. The processor is configured to execute a translated code stream using a native instruction set architecture, and the memory is communicatively connected to the processor. The memory includes a plurality of instructions which, when executed, cause the computing system to execute one or more native instructions on the processor, the one or more native instructions forming a portion of a translated code stream corresponding to a translation of a plurality of non-native operators. The plurality of instructions also cause the computing system to, during execution of one or more native instructions corresponding to each non-native operator in the code stream by the code execution unit, count the occurrence of the non-native operator, determine a duration of execution of the one or more native instructions, and add the non-native operator to a trace sequence. The plurality of instructions also cause the computing system to, after execution of the translated code stream, generate a data file of non-native operators executed within the code stream, the data file of operators including a name of each non-native operator, an elapsed amount of time within the code execution unit that the one or more native operators corresponding to the non-native operator are executed, and a number of occurrences of the non-native operator within the code stream.

In a third aspect, a computer-storage medium is disclosed that includes computer-executable instructions stored thereon. When executed on a computing system, the computer-executable instructions cause the computing system to analyze performance of a translated code stream executing within a central processing module, the translated code stream corresponding to a translation of a plurality of non-native operators, the central processing module executing on a computing system. Analyzing performance includes, during execution of one or more native instructions corresponding to each non-native operator in the code stream by the code execution unit, counting the occurrence of the non-native operator, determining a duration of execution of the one or more native instructions, and adding the non-native operator to a trace sequence. Analyzing performance also includes, after execution of the code stream within the central processing module, generating a data file of non-native operators executed within the code stream, the data file of operators including a name of each non-native operator, an elapsed amount of time within the code execution unit that the one or more native operators corresponding to the non-native operator are executed, and a number of occurrences of the non-native operator within the code stream.

BRIEF DESCRIPTION OF THE DRAWINGS

FIG. 7 is an example non-native operator performance profiling chart generated from a central processing module, according to an example embodiment; and FIG. 8 is an example non-native operator sequence frequency chart generated from a native computing system executing a translated code stream, according to an example embodiment.

DETAILED DESCRIPTION

Figure 1:
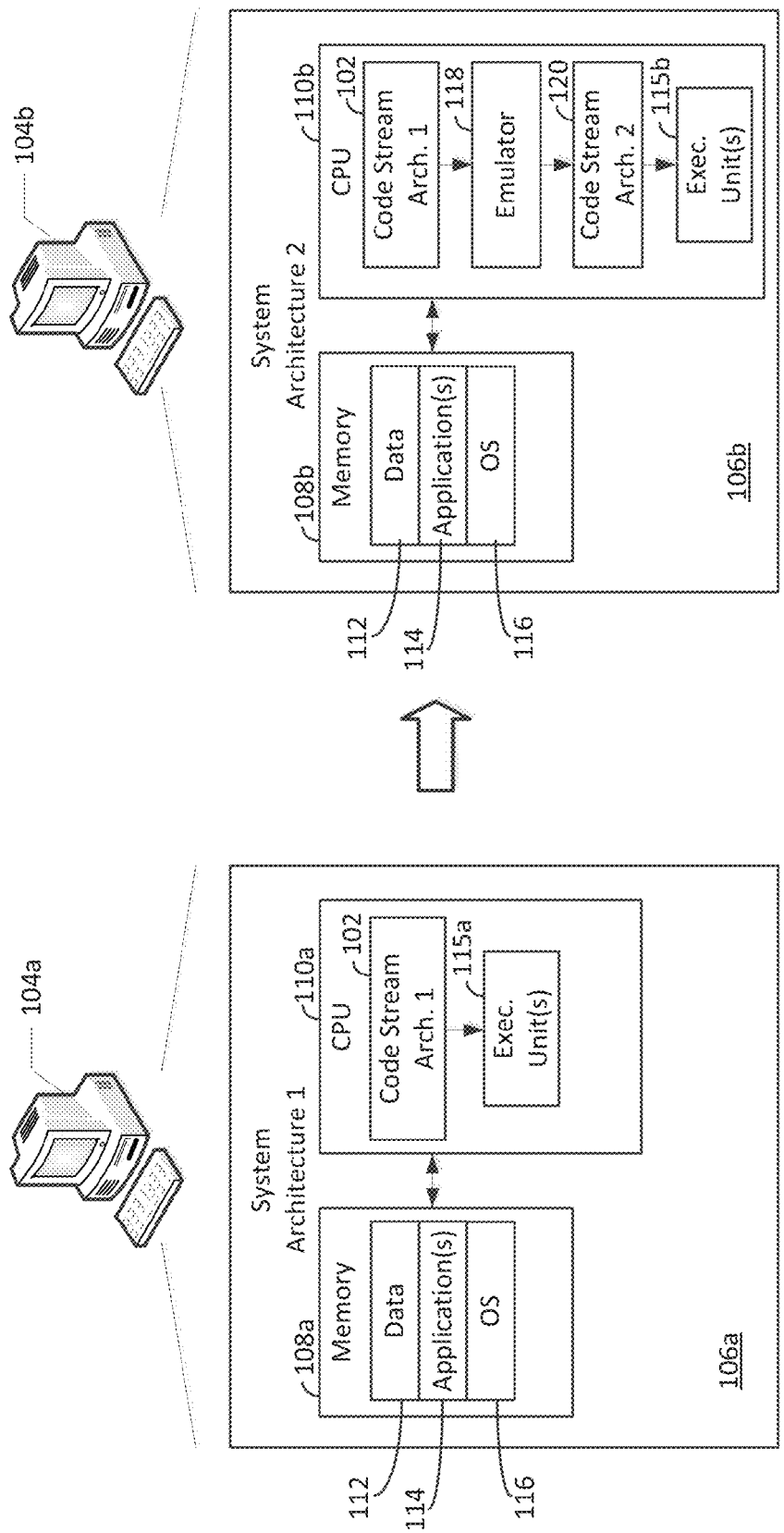
FIG. 1 is a schematic illustration of a plurality of computing systems operating using incompatible instruction set architectures.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to methods and systems for profiling and detecting one or more sequences of operators that are frequently executed in a particular non-native code stream. The methods and systems of the present disclosure provide improved performance within an emulated computing environment while profiling and capturing sequences of non-native instructions, thereby reducing the time required to detect possible locations for optimizing execution of the code stream on a native instruction set architecture. In some embodiments of the present disclosure, information regarding each operator (e.g., the number of occurrences of that operator), duration of execution of a particular operator, and a trace sequence can be obtained during execution of native instructions on a computing system, where those native instructions correspond to a non-native code stream. After execution, one or more charts can be created to profile commonly-executed non-native instructions, or to represent common combinations of non-native instructions that occur within and are executed from the code stream. Such profiles can be used for further development of optimizations in translating the non-native code stream to a native code stream for execution, allowing for improved execution of non-native, or "emulated" software.

Referring now to FIG. 1, a schematic illustration of a plurality of computing systems operating using incompatible instruction set architectures is shown. The illustration shown in FIG. 1 is intended to illustrate execution of a code stream 102 on two computing systems 104a-b using different and incompatible instruction set architectures. In other words, while code stream 102 executes natively on the hardware provided as part of computing system 104a, it is non-native to the computing system 104b, meaning that computing system operates using a different set of instructions, and cannot natively execute those instructions, or operators, included in the code stream.

In further specific detail regarding this distinction between native and non-native execution of a code stream, computing system 104a has a first system architecture 106a, and computing system 104b has a second system architecture 106b. Computing system 104a includes a memory 108a and processing unit 110a, while computing system 104b has a memory 108b and processing unit 110b. Typically, in systems having a different system architecture, different memory address sizes and different instruction lengths may be employed, as well as different sets of registers or other resources within the processing units 110a-b.

In the example shown, each memory 108 includes a variety of different types of stored information, including data 112, applications 114, and an operating system 116. On computing system 104a, the operating system executes natively using the system architecture 106a, and controls operation of the applications 114 and access to data 112. The resulting code stream 102 represents a sequence of binary operations and data that are parsed and executed on the computing system 104a, within one or more execution units 115a of the processing unit 110a.

In contrast, the same data 112, applications 114, and operating system 116 can be stored in memory 108b and can form code stream 102, but that code stream cannot directly be executed by the processing unit 110b. Rather, the code stream 102 is passed to an emulator 118, which converts the code stream 102, which is non-native with respect to system architecture 106b, to a second code stream 120 which is native to that system architecture. That second code stream 120 can then be executed on execution units 115b of the processing unit 110b.

Figure 2:
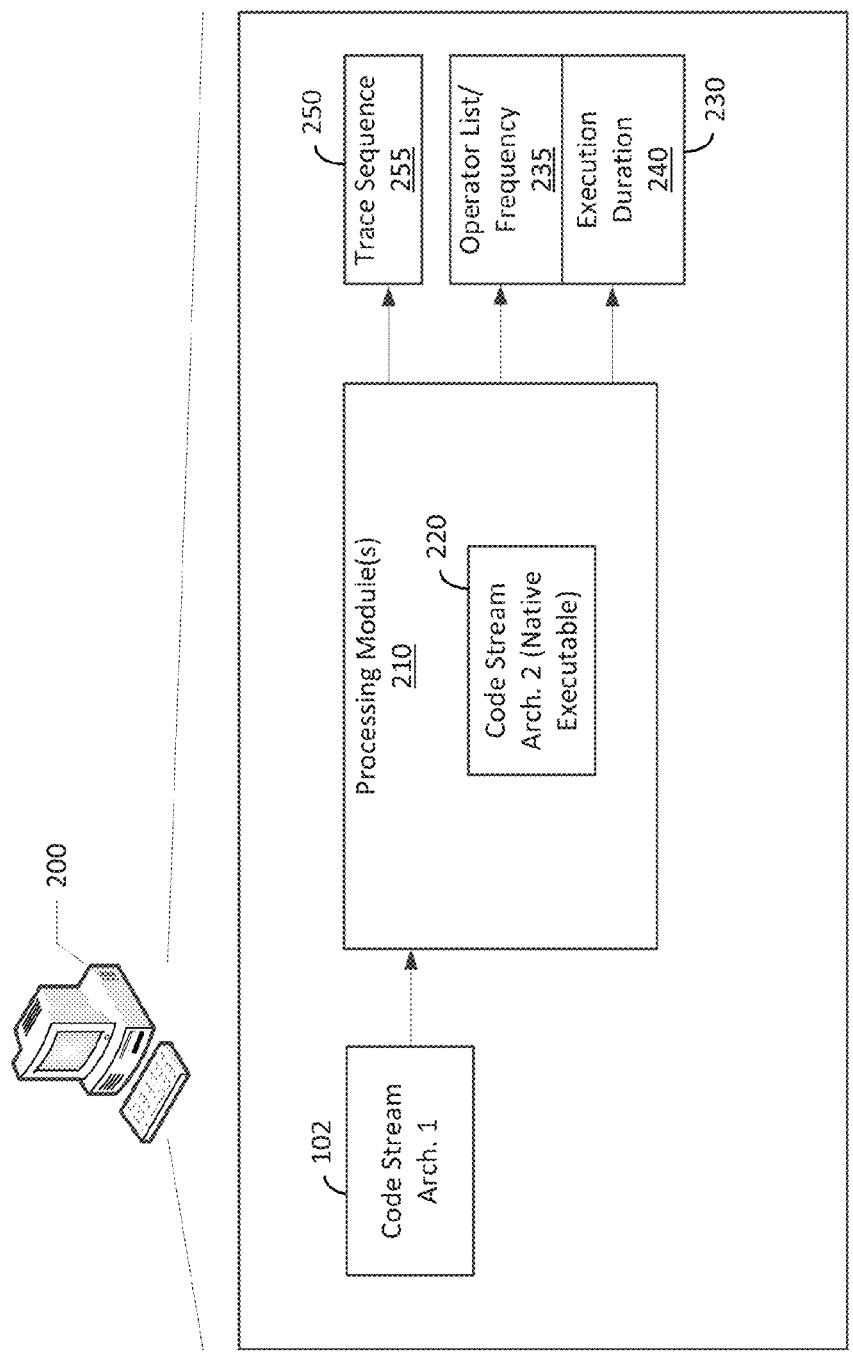
FIG. 2 is a schematic illustration of a target computing system executing code derived from a non-native code stream to generate operator profiling and sequencing data, according to a possible embodiment of the present disclosure.

Referring now to FIG. 2, an example computing system 200 is disclosed which can be configured to execute a translated code stream based on a non-native code stream, for example emulated code as processed by emulator software. The computing system 200 can in some embodiment represent computing system 104b, reflecting the fact that at one time the non-native code stream received at the computing system 200 was written for an instruction set architecture supported by a different hardware system.

The computing system 200 is configured to receive a non-native code stream 102 in memory, and execute that code stream using a translator component, shown as processing module 210. As discussed above, the code stream 102 is a non-native code stream, meaning that it is written for execution on an instruction set architecture that is incompatible with the instruction set architecture of the computing system 200. In some embodiments of the present disclosure, the computing system 200 operates using an Intel-based (x86-based) instruction set architecture (e.g., IA32/x86, IA32-x64/x86-64, IA64, etc.), while the code stream 102 can be written for any of a number of other types of instruction set architectures, such as PowerPC, ARM, MIPS, SPARC, or other similarly incompatible system architectures. The processing module 210 can take a number of forms, but is typically arranged to parse through the code stream one or more times to decompose the code stream into elements describing its contents to provide efficient executable code using the instruction set architecture of the computing system 200.

In some embodiments, the processing module 210 performs functions of emulator 118 of FIG. 1, in that it is configured to decompose the code stream 102 into its constituent operators and parameters for analysis and translation. In some embodiments, the processing module 210 can be configured to decompose the code stream 102 into a variety of arrays of operators for analysis and translation. One method for decomposing such a code stream is described in copending U.S. patent application Ser. No. 13/246,273, filed Sep. 27, 2011 (Unisys Ref. No. 11-002), entitled "Abstracting Computational Instructions to Improve Performance", the disclosure of which is hereby incorporated by reference in its entirety.

In general, in the context of the present disclosure, the processing module is configured to generate a translated code stream 220 of native instructions that can be executed natively on an instruction set architecture of the computing system 200. The translated code stream 220 can in turn be executed by the processing module 210, or another analogous processing module. An example architecture in which various processing modules manage execution of translated code streams is discussed in further detail below in connection with FIG. 3. The processing module 210 can be, for example, a software module representing an environment in which the code stream would execute on a non-native system, but translated to the native system. For example, the processing module 210 could include memory configured to emulate an architecture of a non-native system, and can, when translated code stream 220 is executed, call a variety of routines to change an emulated system state.

In the embodiment shown, the processing module 210 is configured to, when executed, additionally generate two or more files containing information about execution of the translated code stream 220 and correspondingly the non-native code stream 102. In an example embodiment a first file 230 is generated that includes an operator list and frequency of occurrence of that operator 235, as well as an execution duration 240 for that operator. A second file 250 includes a trace sequence 255 of the non-native operators corresponding to the native operators in the translated code stream 220. The trace sequence 255 corresponds to a list of non-native operators in a sequence actually executed at the processing module 210, such that it is possible to detect one or more sequences of non-native operators.

Following generation of the operator list 235, execution duration 240, and trace sequence 255, one or more post-processing operations can be performed on the generated files 230, 250, for example to format and order the data captured in the files. In some embodiments, one or more charts can be created from this data, such as those illustrated in FIGS. 6-7, described below.

In some embodiments, the processing module 210 corresponds to an emulated computing system module, and translation and execution correspond to performance of two passes through the code stream 102 to establish and then execute the translated code stream 220. In other embodiments, one or more different modules could be used to execute the functions of the processing module 210. These alternative embodiments are reflected in the example computer systems 300, 350 of FIGS. 3A-3B, below.

Figure 3A:
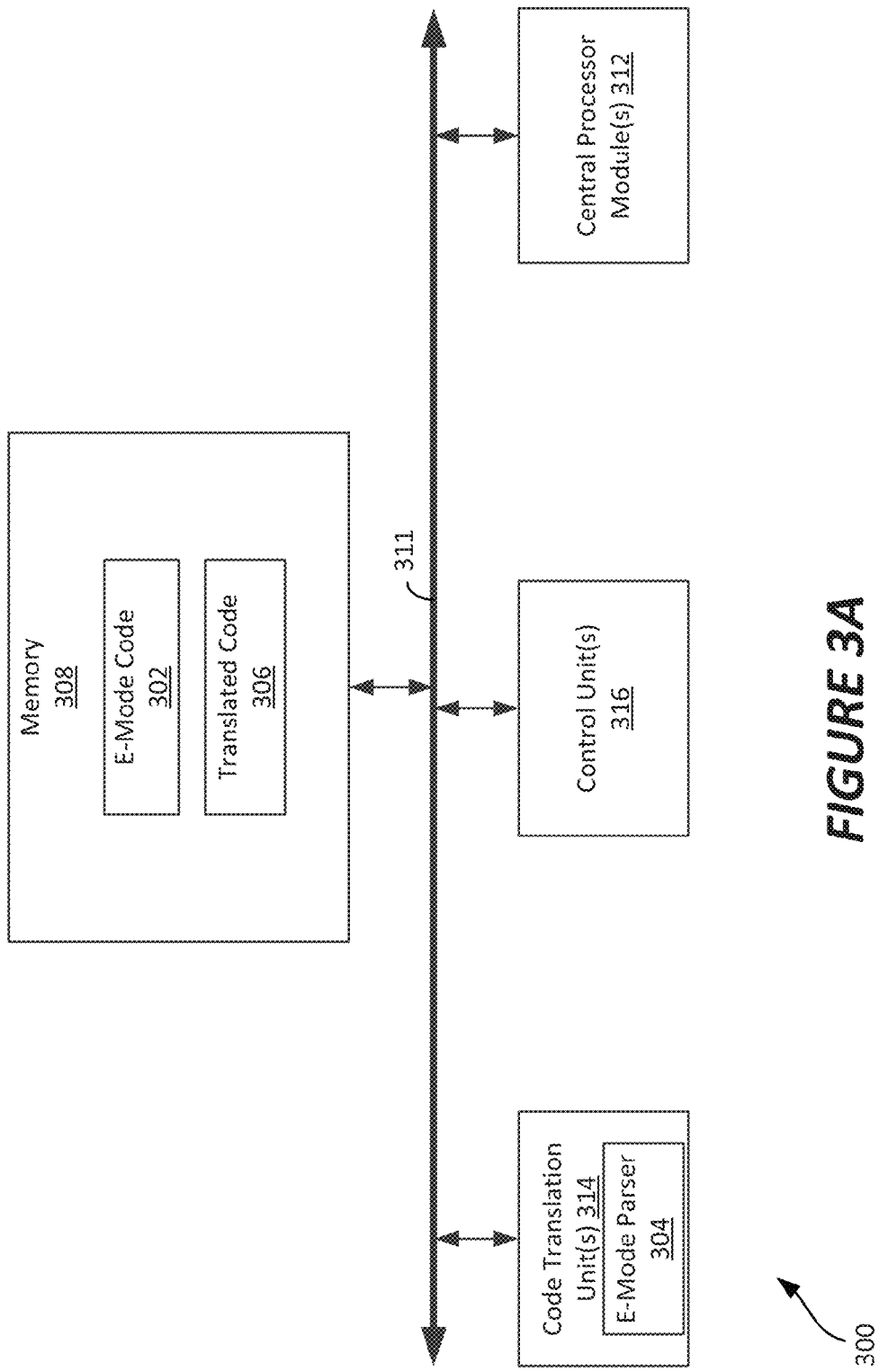
FIG. 3A is a block diagram of an example embodiment of a system in which translation of non-native code based on unexecuted meta-operators in the non-native code segment can be performed, according to a possible embodiment of the present disclosure.

Now referring to FIG. 3A, an example embodiment of a computer system 300 for executing translated code streams is illustrated. The computer system 300 represents a particular example embodiment in which a Unisys Clearpath/MCP computing system is emulated on a computing system having a different instruction set architecture, for example using an Intel-based instruction set architecture. In the context of the present disclosure, a code stream written for execution on a Unisys Clearpath/MCP system software can be translated for execution using native instructions of the Intel-based instruction set architecture. In the MCP environment, the non-native instructions, or foreign operators, comprise the proprietary E-Mode code 302. The native instructions, in some embodiments refers to the Intel 64 and Intel architecture (IA) 32 instruction sets; however, in alternative embodiments configured for execution on different hardware, other systems architectures could be used as well.

In general, in the computer system 300, the non-native E-Mode code 302 is parsed by a parser 304 to form translated code 306, e.g., native Intel instructions. As illustrated in FIG. 3A, the computer system 300 includes a memory 308 that communicates, via an interface 311, with various function processors. The function processors may be implemented in hardware, software, firmware, or any combination thereof. The memory 308 stores the E-Mode code 302 to be parsed by the E-mode parser 304, and can also store the translated code 306. The function processors include one or more central processor modules (CPM) 312, code translation units (CTU) 314, and one or more additional control units 316 (e.g., for controlling I/O or disk interface actions). As illustrated in the embodiment shown, the parser 304 is implemented within CTU 314.

In the example computer system 300 shown, each CPM 312 is responsible for execution of the translated code 306. In virtual machine implementations, the CPM 312 can be one or more processes that embody an execution engine, each of which is configured to execute the translated code 306, for example by calling one or more routines defined in that CPM.

Figure 3B:
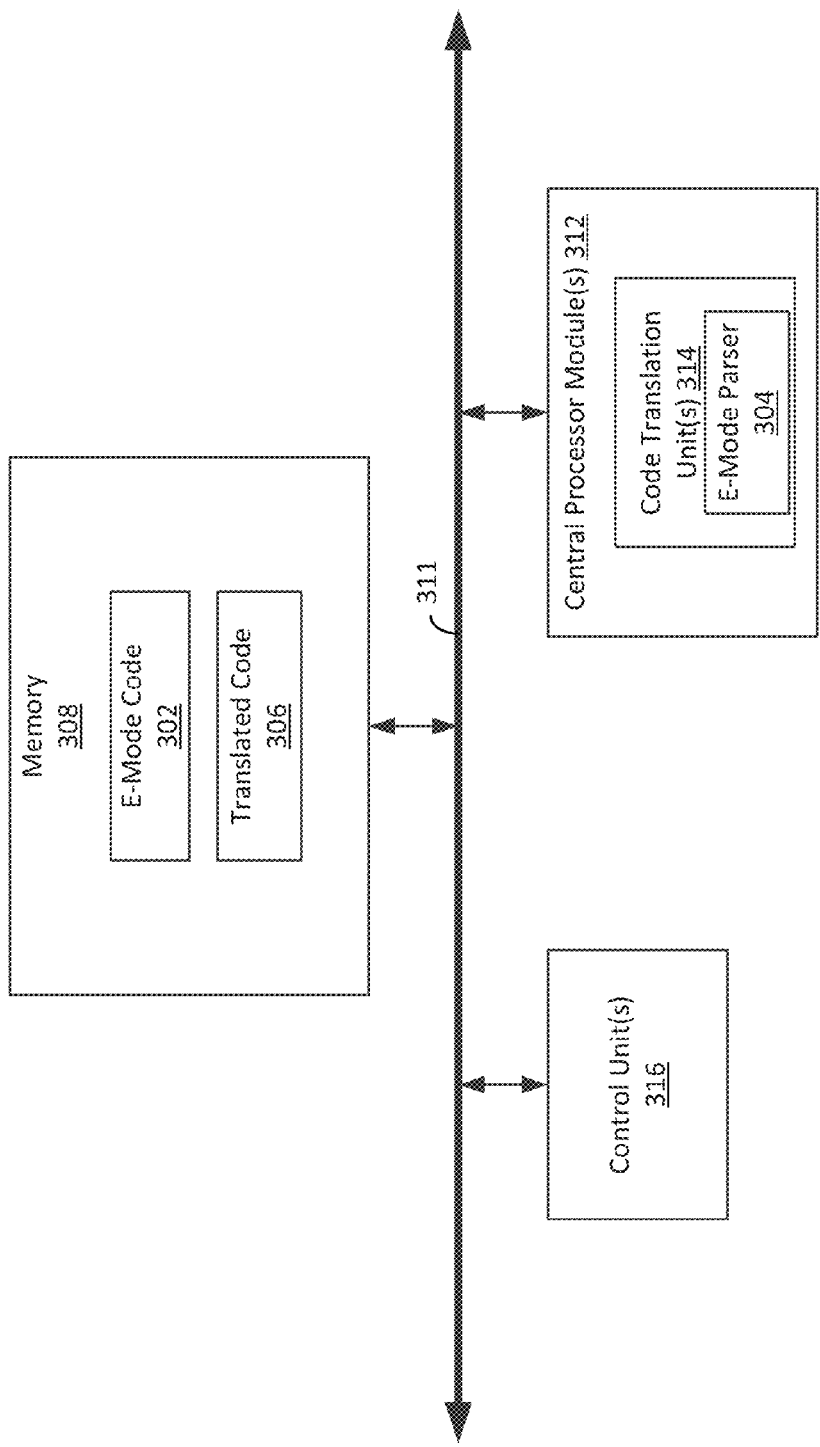
FIG. 3B is a block diagram of an example embodiment of a system in which translation of non-native code based on unexecuted meta-operators in the non-native code segment can be performed, according to a second possible embodiment of the present disclosure.

Referring now to FIG. 3B, an alternative embodiment of the computer system 350 is shown in which one or more CPMs 312 include a CTU 314 and parser 304 incorporated therein. In such embodiments, the CTU 314 and parser 304 can execute in a manner such that the CPM can receive the E-mode code 302 and the CTU 314 and parser 304 can generate translated code 306; that code can then asynchronously (e.g., separately and/or later in time) execute that translated code 306 to perform one or more functions defined in the CPM, to adjust the system state managed by that CPM. In comparison to FIG. 3A, the arrangement of computing system 350 in FIG. 3B may be implemented in an application execution architecture, rather than a resource management-type arrangement as illustrated in FIG. 3A. Furthermore, although two differing embodiments are illustrated in FIGS. 3A-3B, it is recognized that a variety of other module arrangements could be used.

Figure 4:
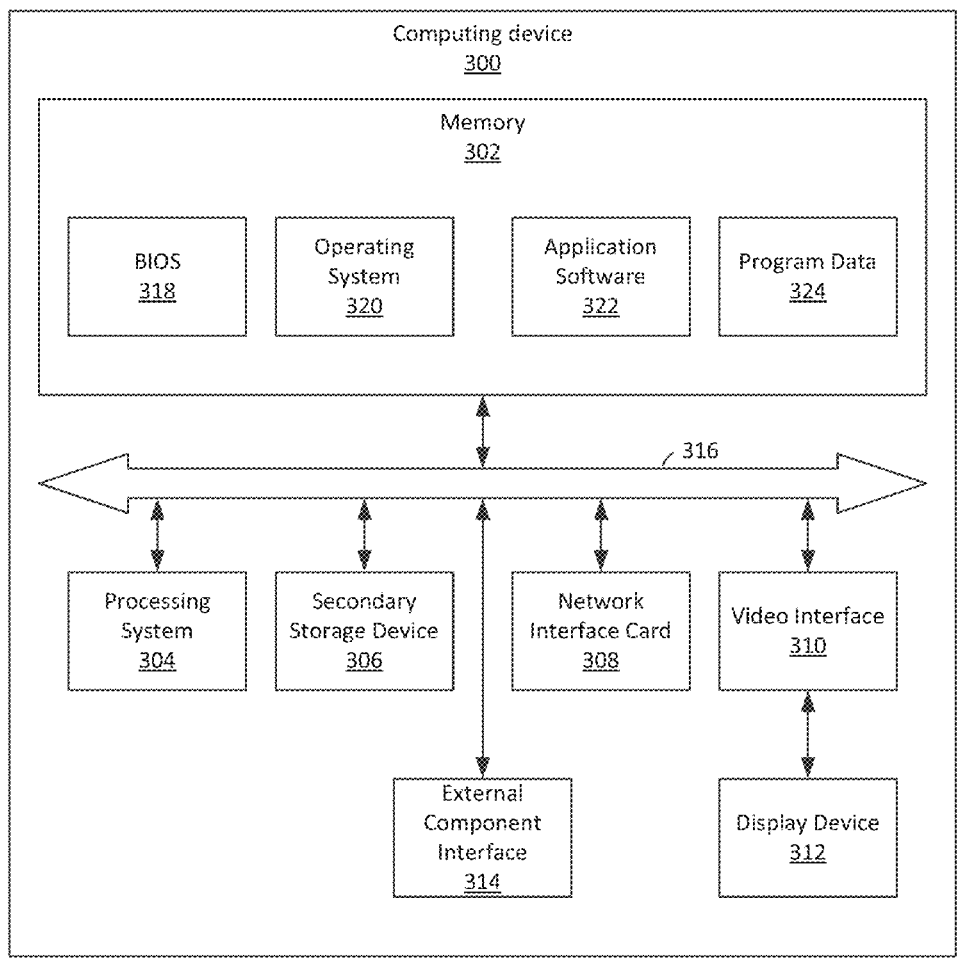
FIG. 4 is a schematic illustration of an example computing system in which aspects of the present disclosure can be implemented.

Referring now to FIG. 4, a schematic illustration of an example computing system in which aspects of the present disclosure can be implemented. The computing system 400 can represent, for example, a native computing system within which one or more of systems 104a-b, 200, or 300 could be implemented. In particular, in various embodiments, the computing device 400 implements one particular instruction set architecture, and can be used to execute emulation software and/or translate non-native code streams for execution in accordance with the methods and systems described herein.

In the example of FIG. 4, the computing device 400 includes a memory 402, a processing system 404, a secondary storage device 406, a network interface card 408, a video interface 410, a display unit 412, an external component interface 414, and a communication medium 416. The memory 402 includes one or more computer storage media capable of storing data and/or instructions. In different embodiments, the memory 402 is implemented in different ways. For example, the memory 402 can be implemented using various types of computer storage media.

The processing system 404 includes one or more processing units. A processing unit is a physical device or article of manufacture comprising one or more integrated circuits that selectively execute software instructions. In various embodiments, the processing system 404 is implemented in various ways. For example, the processing system 404 can be implemented as one or more processing cores. In another example, the processing system 404 can include one or more separate microprocessors. In yet another example embodiment, the processing system 404 can include an application-specific integrated circuit (ASIC) that provides specific functionality. In yet another example, the processing system 404 provides specific functionality by using an ASIC and by executing computer-executable instructions.

The secondary storage device 406 includes one or more computer storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 includes various types of computer storage media. For example, the secondary storage device 406 can include one or more magnetic disks, magnetic tape drives, optical discs, solid state memory devices, and/or other types of computer storage media.

The network interface card 408 enables the computing device 400 to send data to and receive data from a communication network. In different embodiments, the network interface card 408 is implemented in different ways. For example, the network interface card 408 can be implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display unit 412. The display unit 412 can be various types of devices for displaying video information, such as a cathode-ray tube display, an LCD display panel, a plasma screen display panel, a touch-sensitive display panel, an LED screen, or a projector. The video interface 410 can communicate with the display unit 412 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 414 enables the computing device 400 to communicate with external devices. For example, the external component interface 414 can be a USB interface, a FireWire interface, a serial port interface, a parallel port interface, a PS/2 interface, and/or another type of interface that enables the computing device 400 to communicate with external devices. In various embodiments, the external component interface 414 enables the computing device 400 to communicate with various external components, such as external storage devices, input devices, speakers, modems, media player docks, other computing devices, scanners, digital cameras, and fingerprint readers.

The communications medium 416 facilitates communication among the hardware components of the computing device 400. In the example of FIG. 4, the communications medium 416 facilitates communication among the memory 402, the processing system 404, the secondary storage device 406, the network interface card 408, the video interface 410, and the external component interface 414. The communications medium 416 can be implemented in various ways. For example, the communications medium 416 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418 and an operating system 420. The BIOS 418 includes a set of computer-executable instructions that, when executed by the processing system 404, cause the computing device 400 to boot up. The operating system 420 includes a set of computer-executable instructions that, when executed by the processing system 404, cause the computing device 400 to provide an operating system that coordinates the activities and sharing of resources of the computing device 400. Furthermore, the memory 402 stores application software 422. The application software 422 includes computer-executable instructions, that when executed by the processing system 404, cause the computing device 400 to provide one or more applications. The memory 402 also stores program data 424. The program data 424 is data used by programs that execute on the computing device 400.

Although particular features are discussed herein as included within an electronic computing device 400, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5:
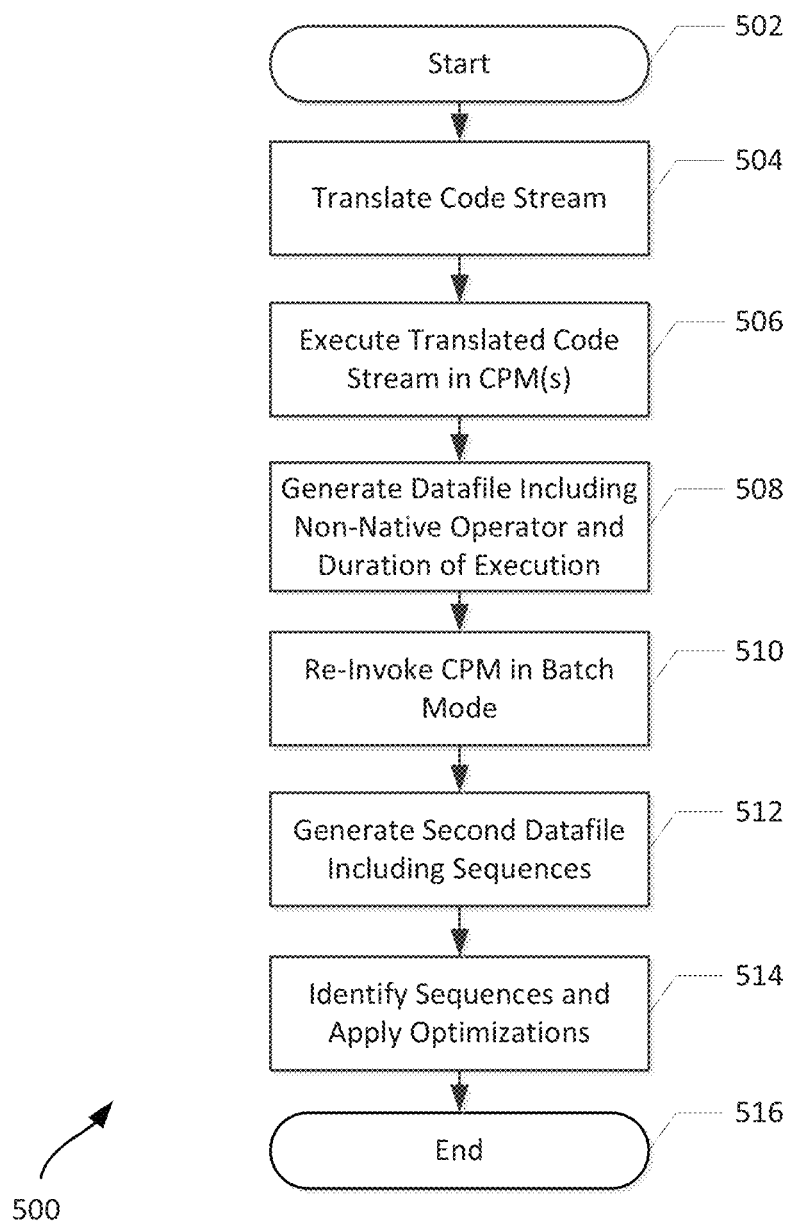
FIG. 5 is a flowchart illustrating a method of analyzing performance of a translated code stream corresponding to a translation of a plurality of non-native operators executing within a central processing module, according to an example embodiment.

Referring now to FIG. 5, a flowchart illustrating a method 500 of analyzing performance of a translated code stream corresponding to a translation of a plurality of non-native operators executing within a central processing module, according to an example embodiment. The methods 500 can be implemented as one or more software modules within a processing module or other equivalent native software application or native operating system of a computing system, such as system 104*b*, or systems 200-400 of FIGS. 2-4, above.

The method 500 is instantiated at a start operation 502, which generally can correspond to initialization of a target computing system and associated translation software for executing a non-native code stream, for example by initializing execution in a batch mode for emitting operational statistics from software modules on the target computing system.

A translation operation 504 corresponds to receipt of a non-native code stream and translation of that non-native code stream to one or more native operators for execution within the processing module or modules that received the code stream. In some embodiments, the translation operation corresponds to decomposing a code stream, such as code stream 102, into arrays of operators and a map of operator sequences for analysis and translation, as described in U.S. patent application Ser. No. 13/246,273, filed Sep. 27, 2011 (Unisys Ref. No. 11-002), entitled "Abstracting Computational Instructions to Improve Performance", the disclosure of which was previously incorporated by reference in its entirety. In general, the translation of the non-native code stream can include one or more concatenations of non-native operators for translation, for example to exploit efficiencies gained by avoiding one-to-one, operator-to-operator translation. Such concatenations of non-native operators are generally included within the translation model, and can be selectively applied by way of a command line switch or other manner to set preferences regarding performance of the processing module.

An execution operation 506 corresponds to execution of a translated, native code stream, which is the result of the translation operation 504, within one or more processing modules. The processing modules can be, in some embodiments, CPMs 312 of FIG. 3; as such the CPMs can perform both the translation and execution of the non-native code stream, thereby allowing each CPM to track execution times for each of the translated operators, and correlate that to execution times for each non-native operator. In the embodiments discussed herein, as the native code stream is executed, each executing CPM can be configured to emit operational statistics regarding the non-native operators being translated and executed, as well as the execution times for those operators. For example, operational statistics, such as operators executed and elapsed time of execution, as well as a trace sequence, can be emitted and stored in one or more files, as discussed above in connection with FIG. 2. A method of emitting such operational statistics useable for analysis of execution of the code stream is illustrated in connection with FIG. 6, described below.

Following the execution operation 506, a data file generation operation 508 generates a first data file useable for profiling one or more operators executed as part of the non-native code stream received at the processing modules. The data file can include, for example, a name of an operator, a number of times that operator was executed as part of the code stream, and a percentage and/or total amount of time executing that instruction. The data file generation operation 508 can optionally also order the data included in the file based on number of occurrences of the operator, or time elapsed in executing the operator. Other operational statistics or ordering could be applied to the data file as well. An example of a chart generated from such a data file is illustrated in FIG. 7, discussed below.

Also following the execution operation 506, a re-invoking operation 510 can be performed, for example to reinvoke the emulator (e.g., the CPM) to generate statistics regarding sequences of operators executed within all of the processing modules active at a particular time. For example, the re-invoking operation 510 can correspond to re-executing at least one of the processing modules in a batch mode, for example by including a "/SEQ" modifier to a command line executable of the processing module. The re-invoking operation 510 can be configured to receive a trace sequence generated from all of the previously executing CPMs during the execution operation 506 and build one or more trees of operator sequences of a predetermined depth. An output file of ordered sequences can be generated, to a depth that can be either predetermined or specified in the batch command. This re-invoking operation 510 can reorder, aggregate, or otherwise combine the data from the file generated in the data file generation operation 508, such as operator sequence information, and optionally the times and counts file in any manner desired. A desirable aspect of re-invoking operation 510 is that the processing time, which may be considerable, does not burden and thus distort the execution operation 506.

A second data file generation operation 512 generates a corresponding data file illustrating the operator sequences and associated frequency and execution time information previously generated within the CPMs. An example chart that can be generated from such a data file, illustrating sequences of operators to a predetermined depth of three operators, is illustrated in FIG. 8 and described further below. However, in other embodiments, other predetermined depths could be used. In some embodiments, a predetermined depth of a sequence of operators up to five operators in length can be provided. However, in other embodiments, different lengths of sequences of operators could be used as well. Optionally, following generation of the data file of operator sequences and frequency, an optimization operation 514 can be performed by a user of a computing system. The optimization operation 514 can take many forms. In some embodiments, the optimization operation corresponds to analysis of the sequences of operators and associated execution times to determine candidate sequences of operators to inspect for improvements in translation to native operators. In some embodiments, this can include creating one or more concatenations of non-native operators for performance by a different corresponding combination of native operators. Examples of concatenation and optimization are discussed in further detail in U.S. patent application Ser. No. 13/246,273, filed Sep. 27, 2011 (Unisys Ref. No. 11-002), entitled "Abstracting Computational Instructions to Improve Performance", the disclosure of which was previously incorporated by reference in its entirety.

An end operation 516 corresponds to completed execution and analysis of the one or more code streams under consideration for optimization, and for which performance profiling statistics are generated.

Figure 6:
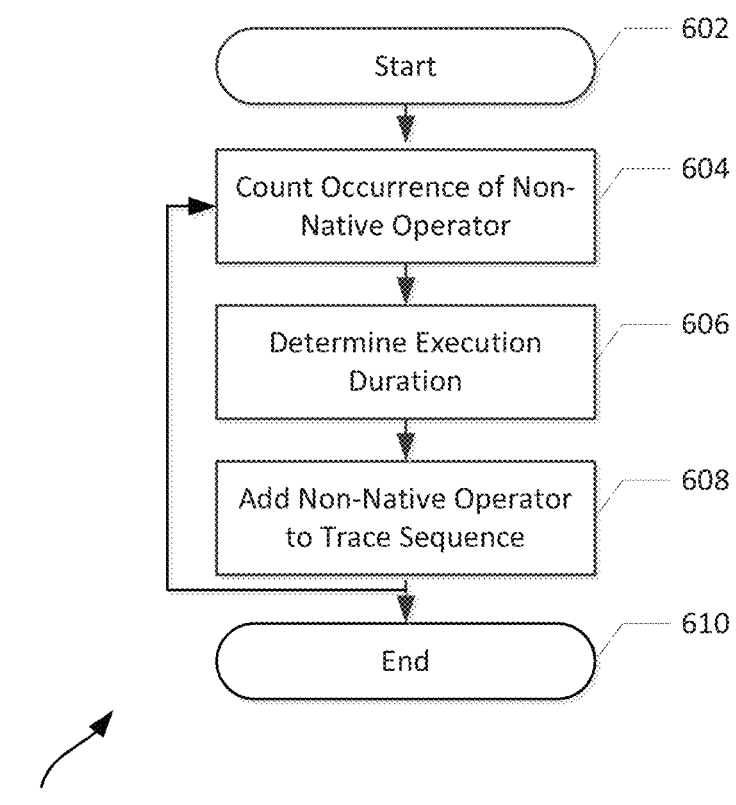
FIG. 6 is a flowchart illustrating a method of executing a translated code stream within a central processing module and emitting statistics useable for performance analysis, according to an example embodiment.

Referring now to FIG. 6, a flowchart illustrating a method 600 is shown for executing a translated code stream within a central processing module and emitting statistics useable for performance analysis. The method 600 is generally performed during execution of translated code, for example as discussed above in connection with the execution operation 506 and optionally the translation operation 504 of FIG. 5.

In the embodiment shown, the method 600 is instantiated at a start operation 602, which corresponds to initial execution of a non-native code stream in a processing module, including translation of the non-native code stream into a translated code stream. A count operation 604 is performed for each operator in the non-native code stream (or concatenated set of operators, as identified during parsing and translation of the code stream for translation), in which an occurrence of the operator is counted, for example using a data structure maintained in main memory of the computing system on which the method 600 is implemented. An execution duration operation 606 determines a duration of execution of operation of the operator, and adds that to the entry as well. Additionally, a trace sequence operation 608 adds the operator to a trace sequence of operators that is created for each operator executed. For example, in the instance where the code stream is translated and executed in computing system 300 of FIG. 3, if multiple CPMs are running concurrently, the trace sequence will represent a sequential listing of non-native operators performed by each of the CPMs in order of completion.

It is noted that, in certain embodiments, each of operations 604-608 are individually optional in any combination, and in various embodiments various combinations of these operations can be selected. In further embodiments, other operations could be used, to obtain other types of execution data. Furthermore, because each of the operations 604-608 is selectively performable, in some circumstances none of the operations are performed, representing standard (non-traced) operation of the CPMs.

Referring generally to FIG. 6, operations 604-608 are repeated for each operator executed from a code stream until completion, at which time one or more data files may be generated from the captured data (e.g., as illustrated in FIG. 5). Furthermore, at one or more times during execution of the overall method 600, one or more entries into a text file can be created, for example listing the operator and operator count as tracked in main memory by the count operation, or duration information as tracked by the execution duration operation 606. Additionally, the trace sequence operation 608 can optionally be output to a separate file from the operator count and execution time, and can be re-invoked after execution of the CPM to generate a data file of sequences of operators that typically occurs within and is executed from a code stream, such as the second data file generation operation 512 of FIG. 5.

Furthermore, in some embodiments, counts and times obtained during operations 604-608 can be reset at any given time by execution of a native code operation configured for this purpose. Additionally, accumulation of the selected quantities can also be started or stopped at any selected point in the native code stream by execution of a native code operator. Thus, it is possible to selectively measure only a portion of native code execution which is of interest, such as execution of a particular benchmark or portion of a benchmark. Alternately the capture of information can be enabled continuously, or can be controlled by one or more systems or modules external to the executing native code stream. These external systems can be either manually or automatically invoked, for example by receipt of an input at a user interface in a computing device such as those described herein, or based on an automated process.

It is recognized that each of the operations 604-608 may result in a write operation to a file, either during or after execution of those operations. The file write operation that occurs may provide a performance penalty due to limited write buffer availability. In some embodiments, a double-buffered, ping-pong approach is used for file writing to limit a performance degradation based on continual file writes. Other file management techniques could be used as well.

Referring to FIGS. 5-6, it is noted that in some embodiments, during execution of a processing module operator counts and execution times are generally emitted to a data file in conjunction with execution of the code stream, in that as each operator is translated and executed statistics regarding that operator are emitted by the processing module and written to a data file. In alternative embodiments, one or more settings can be provided for execution of the code stream in a processing module such that statistics are emitted at predetermined times, e.g., every 30 seconds. Such embodiments may be useful in cases where periodic delays (to account for file write operations) are advantageous over a continuous set of file write operations occurring on the native system during execution of the code stream.

Referring now to FIGS. 7-8, example charts are illustrated representing an output of execution of one or more processing modules (e.g., CPMs) to profile operator execution times, as well as to view an ordered list of common sequences of non-native operators that are translated and executed in a computing system. By analyzing the charts generated based on output from a computing system on a number of different workflows, it is possible to identify areas or sequences of instructions to which attention should be paid, for example to determine any available optimizations in translating those non-native operators for native execution.

FIG. 7 illustrates a first example chart 700 useable for profiling performance of a computing system in response to a selection of non-native operators in a non-native code stream, as executed from a translated code stream. In the embodiment shown, the chart 700 includes one or more operator columns 702, which can be used to identify the non-native operator executed from the code stream. In various embodiments, different types of operator-identifying information could be displayed. In the embodiment shown, an opcode, operator mode, and operator mnemonic, or name, are included.

The chart 700 also includes a total elapsed time column 704, which illustrates a total duration in which native instructions for accomplishing each non-native operator are executed. In the embodiment shown, duration is expressed in microseconds; however, with longer or shorter code streams or machine frequencies, other scaling could be applied as well.

In the embodiment shown, the chart 700 further includes a count column 706, which includes an aggregation of a number of occurrences of each operator in the code stream. In some embodiments, the count column 706 represents a count of a number of occurrences of a particular operator in an output file generated by a processing module, such as the output file 230 of FIG. 2. In other embodiments, the output file includes the aggregated number of occurrences of the operator already.

One or more additional columns could be included in the chart 700 as well, to assist in analyzing a profile of the code stream. For example, in the embodiment shown, an average time per operator is provided in column 708, while individualized percentage and aggregated percentages of the code stream are provided in columns 710, 712, respectively.

As generally illustrated in FIG. 7, the chart 700 can be organized in a variety of different ways. In the example shown, the chart is ordered based on the operator that is executed for the longest amount of time, since optimizations to execution of that operator has the highest likelihood for providing performance gains for the code stream overall. However, in alternative embodiments, other organizations could be used as well, such as based on a number of occurrences of a particular non-native operator, based on name (e.g., alphabetically), opcode, or other ordering.

FIG. 8 is an example operator sequence frequency chart 800 generated from a central processing module executing in a batch mode, according to an example embodiment. The chart 800 can be, for example, generated based on sequence data output from a processing module during a secondary, batch mode execution of a non-native code stream, as is discussed above in connection with FIG. 5 (e.g., operations 510-512), and based on a trace sequence output from a processing module (e.g., as illustrated in FIG. 2). In the embodiment shown, the chart 800 includes a plurality of operator columns 802a-c, in this case reflecting sequences of up to three consecutive operators that frequently occur within a code stream when that code stream is executed. For example, in the embodiment shown, it can be seen that the combination of operators "CPR_VALC1" followed by "CPR_LIT_ADD_fast" and either "CPR_NAMC_STON" or "CPR_NAMC_STOD" are performed the most frequently. A plurality of count columns 804a-c correspond to the number of times that each of the operators in columns 802a-c are performed, respectively. Time columns 806a-c represent, in the embodiment shown, a total number of microseconds elapsed during execution of all instances of the particular operator in the corresponding column. For example, as seen in chart 800, "CPR_VALC1" is performed 31,404,041 times in the selected code stream, and a total of 173,262 microseconds are used to perform those operations.

Referring to FIG. 8 generally, by analyzing the frequency of selected sequences of operators, it is possible for a user of the methods and systems described herein to identify candidate combinations of non-native operators for optimization, for example by concatenating two or more operators for combined translation to native instructions that would provide increased efficiency as compared to the translations of instructions from non-native to native on a one-by-one basis. Furthermore, and with respect to FIGS. 7-8, it is noted that, upon concatenation of non-native instructions, such instructions can be viewed as a single non-native operator for purposes of the profiling and sequencing described herein. For example, as shown in FIG. 8, each of the "CPR_" operators correspond to concatenated combinations of non-native operators that can be efficiently translated to native code. However, in alternative embodiments, such concatenations may not be included. Furthermore, other operators present within the chart 800, such as the "LODT" and "DUPL" operators, represent operators available within the non-native instruction set.

Referring now to FIGS. 1-8 overall, it is recognized that the combination of generating a list of operators and trace sequence during execution of a processing module alongside post-processing to develop data files to be analyzed allows the processing modules and associated computing systems on which they are executed to operate with a reduced performance penalty, thereby making performance analysis of such emulated systems feasible.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of analyzing performance of a translated code stream executing within a central processing module executing on a computing system, the translated code stream corresponding to a translation of a code stream including a plurality of non-native operators not natively executable in an instruction set architecture of the computing system but natively executable in a computing system implementing a different instruction set architecture, the central processing module, the method comprising:
during execution of one or more native instructions in the translated code stream corresponding to each non-native operator in the code stream by the central processing module:
counting the occurrence of the non-native operator;
determining a duration of execution of the one or more native instructions; and
adding the non-native operator to a trace sequence;
after execution of the translated code stream within the central processing module, generating a data file of the plurality anon-native operators within the code stream, the data file including a name of each non-native operator in the code stream, an elapsed amount of time within the central processing module that the one or more native operators corresponding to each non-native operator are executed, and a number of occurrences of each non-native operator within the code stream;
wherein at least one of the non-native operators comprises a concatenated instruction representing a combination of a plurality of non-native operators that are collectively translated for execution as part of the translated code stream.

2. The method of claim 1, further comprising generating a table containing counted occurrences of each non-native operator executed within the code stream and the duration of execution of each non-native operator.

3. The method of claim 1, further comprising, prior to generating the data file of non-native operators, re-invoking the central processing module in a batch mode to build a data file of one or more trees, each tree including one or more sequences of two or more consecutive non-native operators.

4. The method of claim 3, further comprising generating a second data file including a plurality of sequences of non-native operators based at least in part on the trace sequence, the second data file further including, for each of the plurality of sequences of non-native operators, a number of occurrences of each of the non-native operators in the sequence and an elapsed time of execution of each of the non-native operators in the sequence.

5. The method of claim 4, wherein each of the plurality of sequences of non-native operators includes between two and five non-native operators.

6. The method of claim 5, further comprising identifying one or more sequences of non-native operators executed above a predetermined frequency within the code stream, at least in part based on the second data file.

7. The method of claim 6, further comprising optimizing the identified one or more sequences of non-native operators.

8. The method of claim 7, wherein optimizing the identified one or more sequences of non-native operators includes identifying a combination of native operators useable to perform equivalent operations, and which results in lower execution time than a corresponding set of translated operators determined on an instruction-by-instruction basis.

9. The method of claim 1, wherein the plurality of non-native operators comprises E-mode code.

10. The method of claim 1, wherein the translated code stream comprises instructions in a native instruction set architecture.

11. The method of claim 10, wherein the native instruction set architecture comprises an x86-based instruction set architecture.

12. The method of claim 11, wherein the x86-based instruction set architecture comprises an x86-64 instruction set architecture.

13. The method of claim 1, wherein one or more of the non-native operators comprises a sub-operator.

14. A computing system comprising:
a processor configured to execute a translated code stream using a native instruction set architecture;
a memory communicatively connected to the processor, the memory including a plurality of instructions which, when executed, cause the computing system to:
execute one or more native instructions on the processor, the one or more native instructions forming a portion of a translated code stream corresponding to a translation of a code stream including a plurality of non-native operators, the plurality of non-native operators not natively executable by an instruction set architecture of the processor but natively executable by a processor implementing a different instruction set architecture;
during execution of one or more native instructions corresponding to each non-native operator in the code stream by the central processing module:
count the occurrence of the non-native operator;
determine a duration of execution of the one or more native instructions; and
add the non-native operator to a trace sequence; and
after execution of the translated code stream, generate a data file of non-native operators executed within the code stream, the data file of operators including a name of each non-native operator, an elapsed amount of time within the central processing module that the one or more native operators corresponding to the non-native operator are executed, and a number of occurrences of the non-native operator within the code stream;
wherein at least one of the non-native operators comprises a concatenated instruction representin a combination of a plurality of non-native operators that are collectively translated for execution as part of the translated code stream.

15. The system of claim 14, wherein the instructions further includes one or more central processor modules configured to execute at least a portion of the code stream, the one or more central processor modules configured to emulate operation of a non-native processor.

16. The system of claim 14, wherein the instructions further include an interpreter module configured to translate the one or more non-native instructions into the translated code stream.

17. The system of claim 14, wherein the plurality of non-native operators comprises E-mode code.

18. The system of claim 14, wherein the translated code stream comprises instructions in a native instruction set architecture.

19. A computer-storage medium comprising computer-executable instructions stored thereon which, when executed on a computing system, cause the computing system to:

analyze performance of a translated code stream executing within a central processing module, the translated code stream corresponding to a translation of a code stream including a plurality of non-native operators not natively executable in an instruction set architecture of the computing system but natively executable in a computing system implementing a different instruction set architecture, the central processing module executing on a computing system, wherein analyzing performance includes:

during execution of one or more native instructions corresponding to each non-native operator in the code stream by the central processing module:

counting the occurrence of the non-native operator;

determining a duration of execution of the one or more native instructions; and adding the non-native operator to a trace sequence;

after execution of the code stream within the central processing module, generating a data file of non-native operators executed within the code stream, the data file of operators including a name of each non-native operator, an elapsed amount of time within the central processing module that the one or more native operators corresponding to the non-native operator are executed, and a number of occurrences of the non-native operator within the code stream;

wherein at least one of the non-native operators comprises a concatenated instruction representing a combination of a plurality of non-native operators that are collectively translated for execution as part of the translated code stream.

20. The computer storage medium of claim 19, wherein the plurality of non-native operators comprises E-mode code and the translated code stream comprises instructions in a native instruction set architecture.

* * * * *